(12) United States Patent
Iszlai et al.

(10) Patent No.: US 7,653,894 B2
(45) Date of Patent: Jan. 26, 2010

(54) METHOD AND APPARATUS FOR CLASSIFYING AND MODELING OPERATING SYSTEM IMAGE FOR DATA CENTER MANAGEMENT

(75) Inventors: Sorin Silviu Iszlai, Toronto (CA); Andrei Oprea, Ajax (CA); Michael Scarth, Toronto (CA); Teodor Laurentiu Tecsa, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 1164 days.

(21) Appl. No.: 11/121,596

(22) Filed: May 4, 2005

(65) Prior Publication Data

US 2006/0277025 A1    Dec. 7, 2006

(51) Int. Cl.
G06F 9/45 (2006.01)
(52) U.S. Cl. ...................................... 717/101
(58) Field of Classification Search ................. 707/101
See application file for complete search history.

(56) References Cited

U.S. PATENT DOCUMENTS

| | | | |
|---|---|---|---|
| 6,266,788 B1 | 7/2001 | Othmer et al. | 714/38 |
| 6,487,545 B1 | 11/2002 | Wical | 706/45 |
| 7,356,679 B1* | 4/2008 | Le et al. | 713/1 |
| 2002/0143797 A1 | 10/2002 | Zhang et al. | 707/200 |
| 2003/0088832 A1* | 5/2003 | Agostinelli et al. | 715/526 |
| 2003/0126202 A1 | 7/2003 | Watt | 709/203 |
| 2003/0204609 A1 | 10/2003 | Anderson et al. | 709/229 |
| 2003/0204709 A1 | 10/2003 | Rich et al. | 713/1 |
| 2004/0117414 A1 | 6/2004 | Braun et al. | 707/204 |
| 2004/0230416 A1 | 11/2004 | Ye et al. | 704/5 |
| 2005/0055470 A1 | 3/2005 | Arndt et al. | 710/1 |

* cited by examiner

*Primary Examiner*—John Chavis
(74) *Attorney, Agent, or Firm*—Yee & Associates, P.C.; Jeffrey S. LaBaw

(57) ABSTRACT

A method, apparatus, and computer instructions are provided for classifying and modeling operating system images for data center management. An operating system image may be classified as a golden master image, a snapshot image, or a scripted operating system image. A software model is provided to abstract operating system and platform detail, and provide a consistent and scalable way of dealing with operating system images. An installation mechanism is provided to install images based on priorities. Software installables are attached with a software definition that may either be a software stack or a software module. A software stack comprises at least one software module.

3 Claims, 4 Drawing Sheets

US 7,653,894 B2

METHOD AND APPARATUS FOR CLASSIFYING AND MODELING OPERATING SYSTEM IMAGE FOR DATA CENTER MANAGEMENT

BACKGROUND OF THE INVENTION

1. Technical Field

The present invention relates to an improved data processing system. In particular, the present invention relates to operating system images in data center devices. Still more particularly, the present invention relates to classifying and modeling operating system images for data center management.

2. Description of Related Art

For most data center administrators, image management is one of the many functions they perform in a complex data center. Currently, data center administrators use a number of imaging technologies to manage this complicated task. While these technologies ease the complex operation of imaging operating systems, these technologies are usually complex, platform specific, and fail to support most operating system image types.

For example, Microsoft® ADS may only handle Windows golden master or backup images. Kickstart may be used only for LINUX scripted image install, while Remote Deployment Manager (RDM) may handle different types of images for both LINUX and Windows® platform. Microsoft ADS is an imaging technology, which is available from Microsoft Corporation. Kickstart is an imaging technology, which is available from Red Hat, Inc. RDM is an imaging technology, which is available from International Business Machines Corporation.

In addition to imaging technologies that handle imaging for different platforms, other boot server technologies work together with complementary technologies to provide image support for a specific platform. For example, Jumpstart™ uses Flash Archive to capture images on the Solaris™ platform. Jumpstart and Flash Archive are imaging technologies, which are available from Sun Microsystems, Inc.

Furthermore, the understanding of the word "image" varies from one person to another. Therefore, it would be advantageous to have an improved method that abstracts the operating system and platform details, such that a consistent and scalable way of managing operating system images may be provided that is easily understood by different people.

SUMMARY OF THE INVENTION

Embodiments of the present invention provide a method, apparatus, and computer instructions in a data processing system for classifying and modeling operating system images for data center management. Embodiments of the present invention classify an operating system image as one of a golden master image, a scripted operating system image, and a snapshot image. The embodiments of the present invention also provide a software model that abstracts the operating system and platform detail, and provides a consistent and scalable way of dealing with operating system images.

BRIEF DESCRIPTION OF THE DRAWINGS

The novel features believed characteristic of embodiments of the invention are set forth in the appended claims. The embodiments of the invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
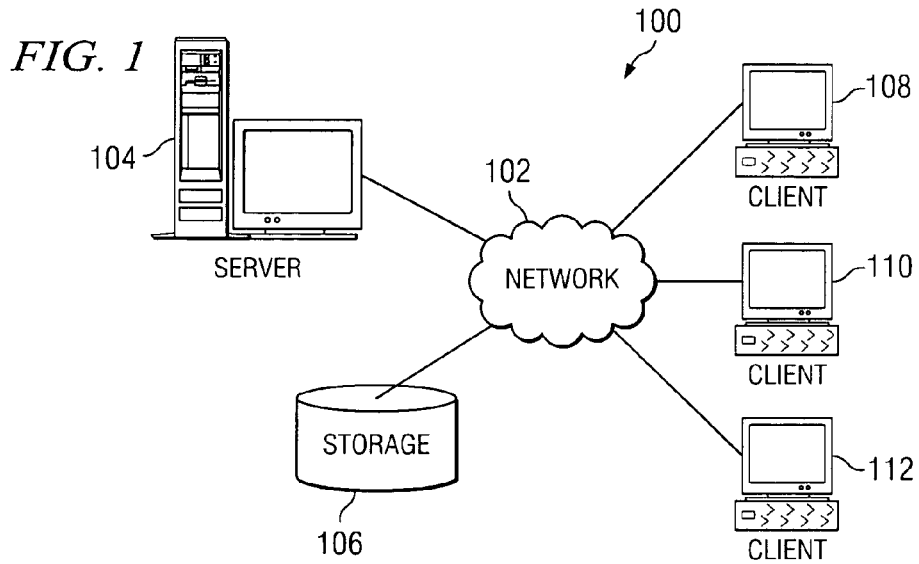
FIG. 1 depicts a pictorial representation of a network of data processing systems in which an illustrative embodiment of the present invention may be implemented.

With reference now to the figures, FIG. 1 depicts a pictorial representation of a network of data processing systems in which an illustrative embodiment of the present invention may be implemented. Network data processing system 100 is a network of computers in which the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. Clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
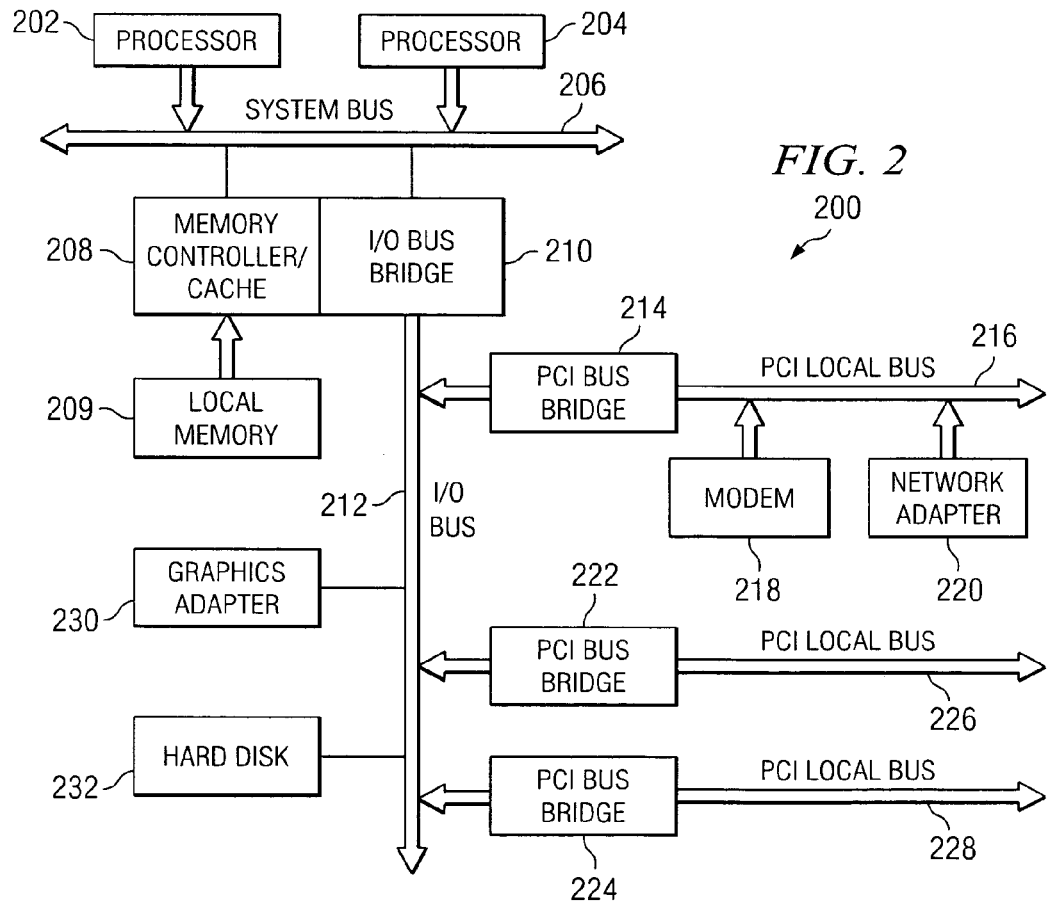
FIG. 2 is a block diagram of a data processing system that may be implemented as a server, in accordance with an illustrative embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. Memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, New York, running the Advanced Interactive Executive (AIX) operating system or the LINUX operating system.

Figure 3:
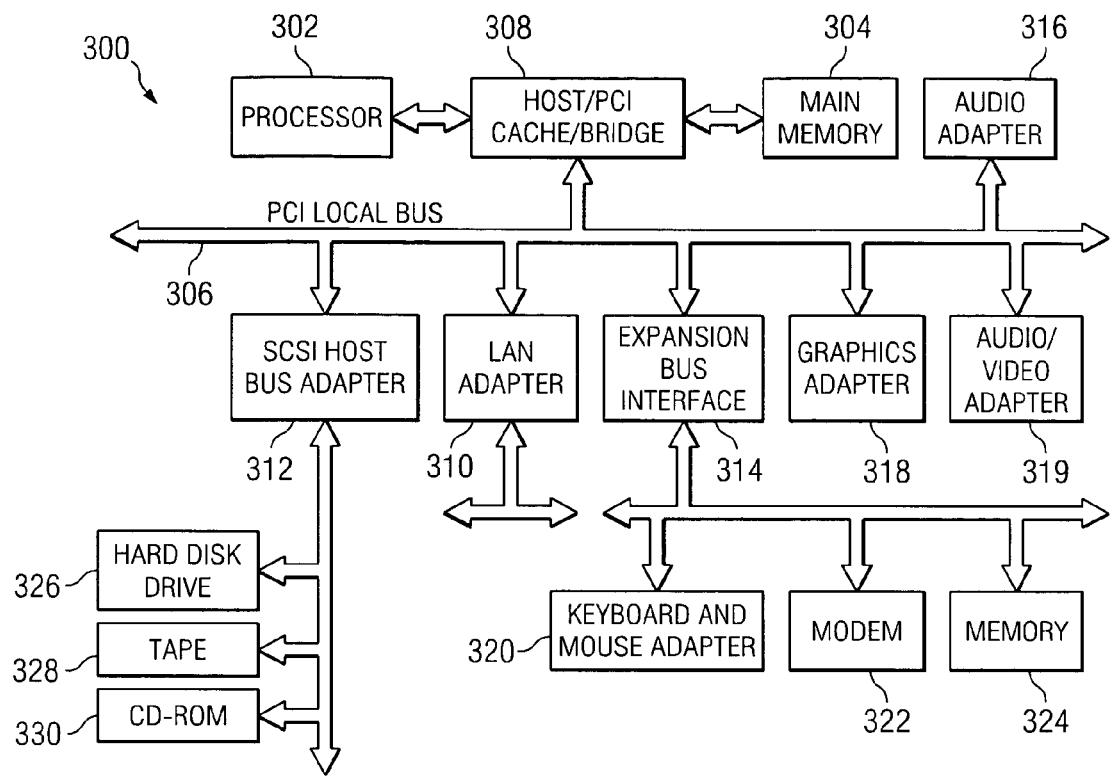
FIG. 3 is a block diagram of a data processing system in which an illustrative embodiment of the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI Bridge 308. PCI Bridge 308 also may include an integrated memory controller and cache memory for processor 302. Additional connections to PCI local bus 306 may be made through direct component interconnection or through add-in boards. In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for keyboard and mouse adapter 320, modem 322, and memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object-oriented programming system, such as Java, may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326 and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent non-volatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand-held computer in addition to taking the form of a PDA. Data processing system 300 also may be a kiosk or a Web appliance.

Figure 4:
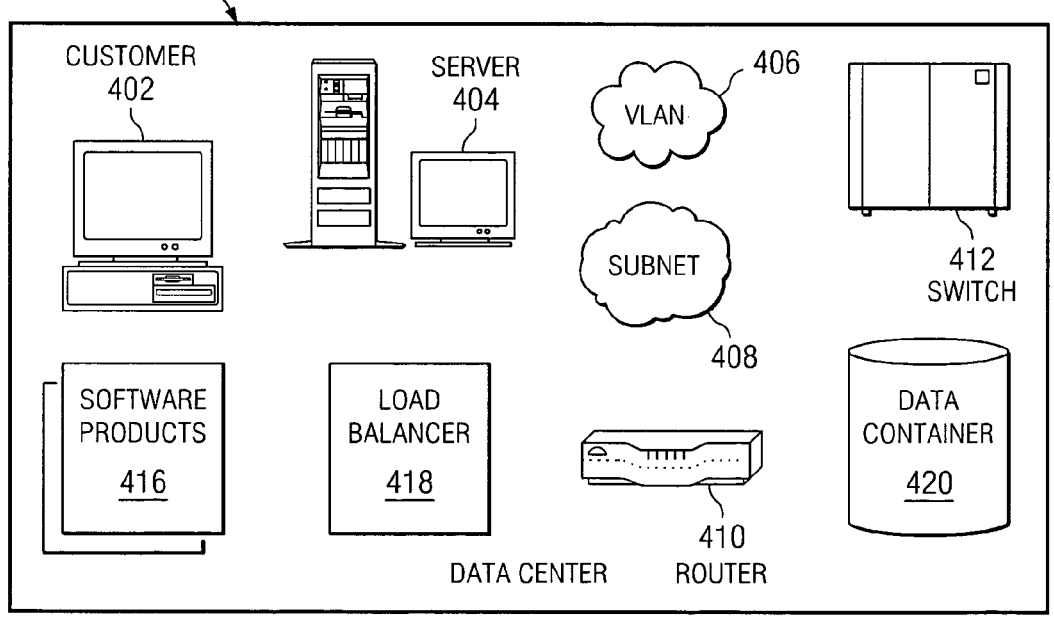
FIG. 4 is a diagram illustrating an exemplary data center, in accordance with an illustrative embodiment of the present invention.

Turning now to FIG. 4, a diagram illustrating an exemplary data center is depicted, in accordance with a preferred embodiment of the present invention. As shown in FIG. 4, in this illustrative example, data center 400 includes resources, such as, customer 402, server 404, Virtual Local Area Network (VLAN) 406, subnet 408, router 410, switch 412, software products 416, load balancer 418, and data container 420.

Customer 402 may be, for example, a client or an administrator who uses a data processing system, such as data processing system 300 in FIG. 3. Server 404 may be implemented as a data processing system, such as data processing system 200 in FIG. 2. Server 404 may also be implemented as an application server, which hosts Web services or other types of servers. Router 410 and switch 412 facilitate communications between different devices. VLAN 406 is a network of computers that behave as if they are connected to the same wire even though they may actually be physically located on different segments of a local area network. Subnet 408 is a portion of a network, which may be a physically independent network segment and shares a network address with other portions of the network.

Software products 416 are applications that may be deployed to a client or a server. Load balancer 418 spreads traffic among multiple systems such that no single system is overwhelmed. Load balancer 418 is normally implemented as software running on a data processing system. Data container 420 may be a database, such as DB2 Universal Database, which is a product available from International Business Machines Corporation.

Data center 400, as depicted in FIG. 4, is presented for purposes of illustrating the present invention. Other resources, such as, for example, a cluster of servers and switch ports, may also be included in data center 400. The mechanism of the present invention manages operating system images of data center devices, including but not limited to images of customer 402 and server 404.

The present invention provides a method, apparatus, and computer instructions for classifying and modeling operating system images for data center management. The processes of the present invention may be performed by a processing unit comprising one or more processors, such as processor 302 in FIG. 3, using computer implemented instructions, which may be located in a memory such as, for example, main memory 304, memory 324, or in one or more peripheral devices 326 and 330.

In an illustrative embodiment, the present invention provides a classification of operating system images and a supporting software model that abstracts operating system and platform details. In these illustrative examples, the classification of operating system images includes three main categories: golden master image, scripted operating system image, and snapshot image.

Golden master image is a depersonalized boot device image that is used for deployment on multiple systems. Usually, golden master image is a complete image of one system with all the necessary applications that is used to image other systems. Golden master image is not personalized in these examples and may be deployed on different types of systems. An example of golden master image is one created using sysprep function in Microsoft ADS.

A scripted operating system (OS) image is similar to an installation compact disc except that no wizards are present. Instead, the scripted OS image comprises the operating system installation files together with some answer or configuration files that automatically install operating system images on the target system using a boot server technology. In these illustrative examples, a scripted OS image is different from the golden master image in that the scripted operating system image is not captured from another machine. Rather, the scripted OS image is run directly from installation files. An example of a scripted OS image consists of Red Hat installation files along with a Kickstart file. The Kickstart installation method is used to install Red Hat LINUX.

A snapshot image is a volume image that is used only for restoring the same system or other identical systems. Snapshot image takes a snapshot of a system and may only be deployed on identical types of systems. An exemplary snapshot image may also be created not using the sysprep function in Microsoft ADS. While these three main categories capture most image types, other types of images may also be classified using the mechanism of the present invention without departing from the scope and spirit of the present invention.

As described above, the mechanism of the present invention also provides a supporting software model that abstracts OS and platform details between different boot server technologies, different platforms, and different operating systems. Operating system images may be present in file repositories of a server, on the same machine with the boot server, or in an internal boot server database. A boot server can manage multiple images that are present in any of these places. The present invention provides a generic flexible software model that accommodates these constraints.

Figure 5:
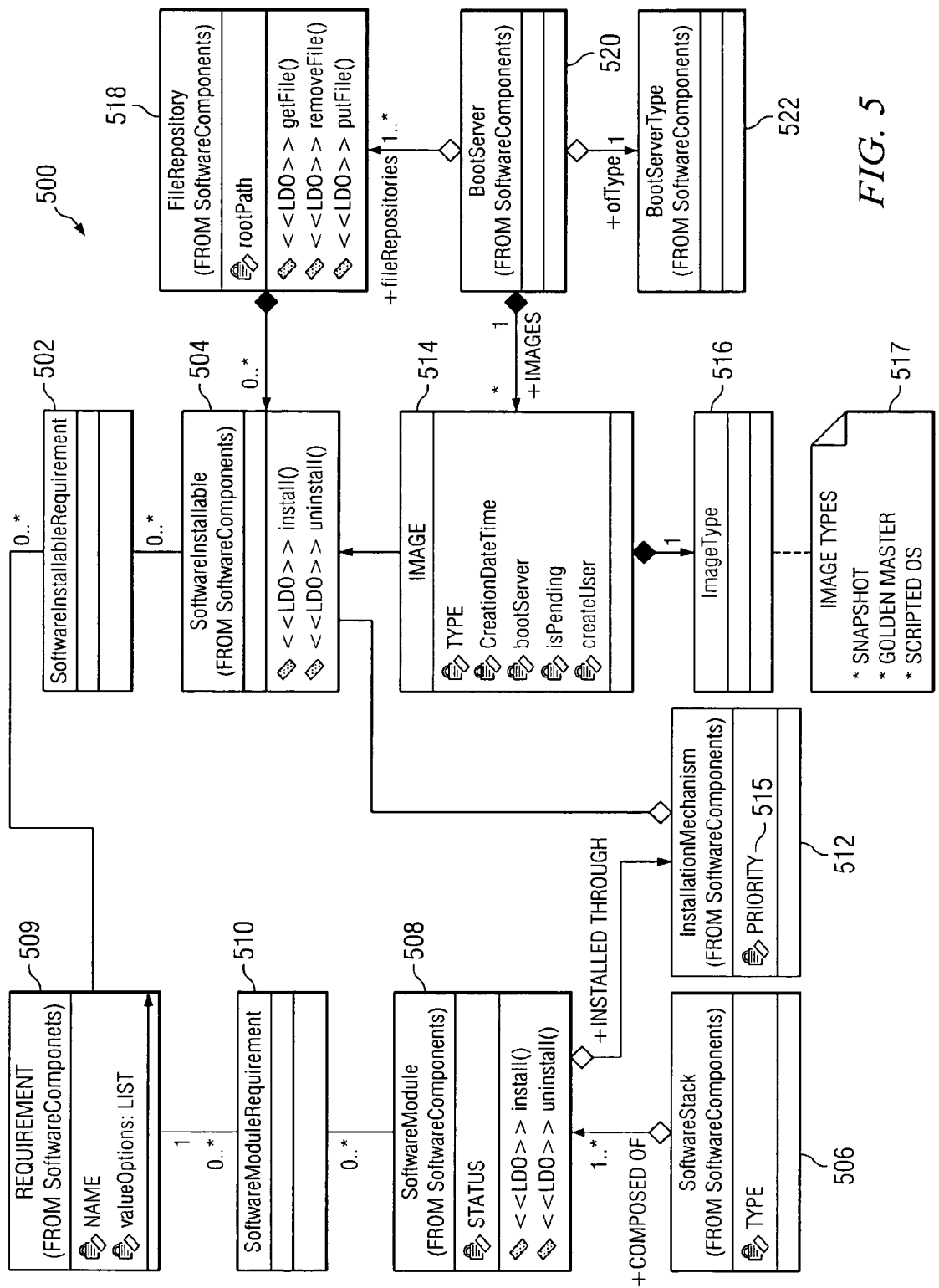
FIG. 5 is a diagram illustrating an exemplary model for operating system imaging in a data center in accordance with an illustrative embodiment of the present invention.

Turning now to FIG. 5, a diagram illustrating an exemplary model for operating system imaging in a data center is depicted in accordance with an illustrative embodiment of the present invention. As depicted in FIG. 5, in exemplary model 500, image 514 is a type of software installable 504. Software installable 504 may have zero or more software installable requirement 502 defined. When capturing an image, hardware platform or architecture may be specified using software installable requirement 502. In addition to image 514, software installable 504 may be a software product represented in .zip format, .exe format, or .tar format.

An image is attached with a software definition that describes its content. A software definition may include one or more software installable 504 images that produce the same result after installation, for example, a golden master image and a scripted OS image. The software definition may be a composed definition, known as software stack 506, or a single definition, known as software module 508.

Software stack 506 is a type of software module 508 and may include one or more software modules 508 with a first module being the operating system module. For example, software stack 506 may be Windows 2000+DB2; which includes a first software module being Windows 2000 and the second module being DB2. Each software module 508 may have zero or more software module requirements 510 defined. Software module requirements 510 describe functional requirements of software module 508. Software module requirements 510 are derived from requirement 509, which is defined by a user.

Software module 508 is installed through installation mechanism 512, which includes priority 515 that defines the priority of software installable 504 images to be installed at the target system. For example, a higher priority may be associated with a golden master image, and a lower priority may be associated with a scripted OS image.

Image 514 is associated with image type 516, which indicates one of the three categories of image types 517: golden master image, scripted OS image, and snapshot image. As described above, software installable 504 images may be present in file repository 518, boot server 520, or an internal database of boot server 520. The present invention accommodates existing imaging technologies by abstracting image types 516 and boot server types 522 each imaging technology supports. For example, if the boot server type is Microsoft ADS, which supports only golden master images and snapshot images, but not scripted OS images, the mechanism of the present invention will recognize a scripted OS image and decides that the particular type of image is not supported based on boot server type 522.

Figure 6:
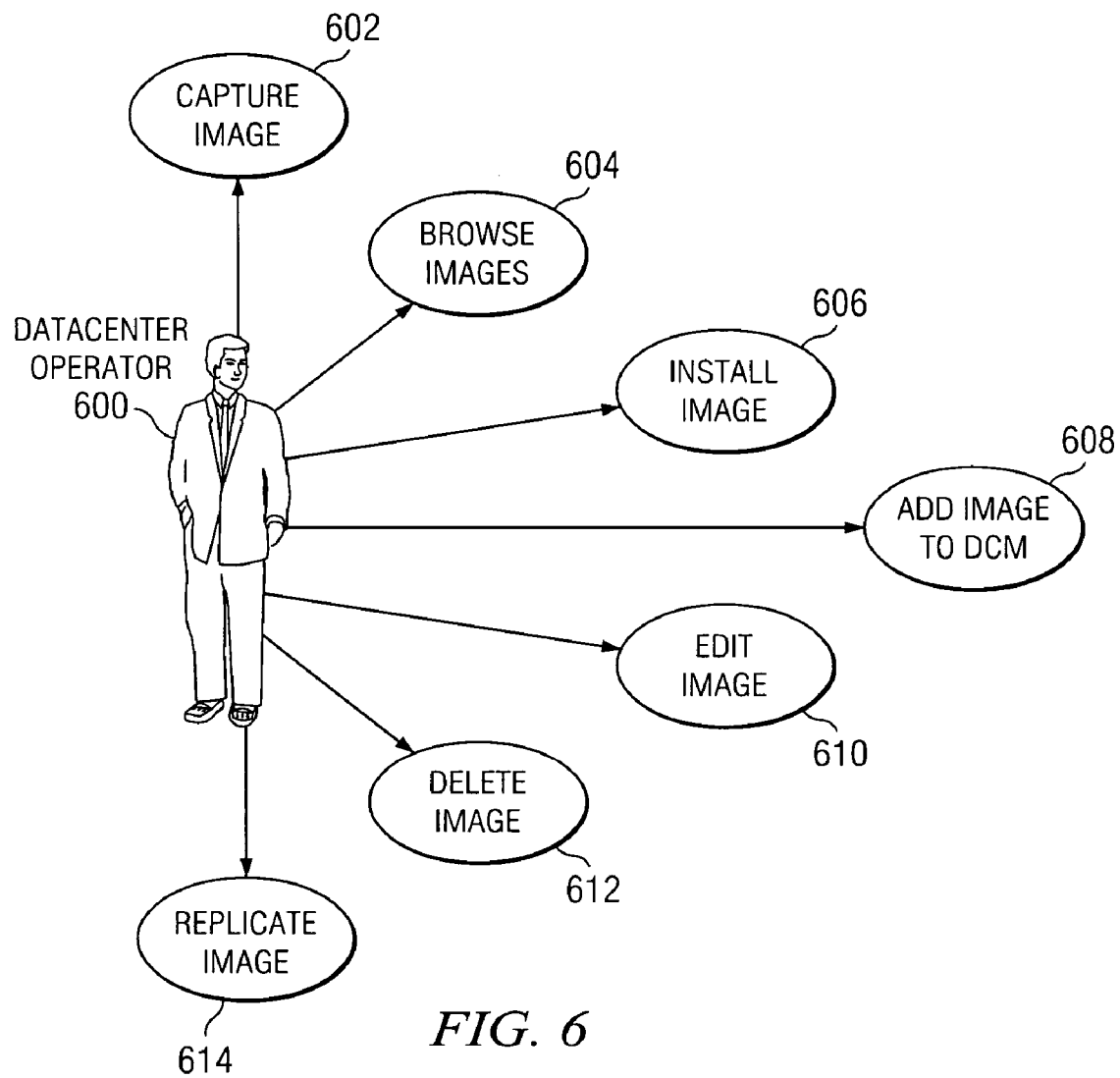
FIG. 6 is a diagram illustrating exemplary use cases for classification and supporting software model for data center management in accordance with an illustrative embodiment of the present invention.

Turning now to FIG. 6, a diagram illustrating exemplary use cases for classification and supporting software model for data center management is depicted in accordance with an illustrative embodiment of the present invention. As shown in FIG. 6, data center operator 600 may use the software model provided by the present invention to capture image 602, to browse images 604, to install an image 606, or add an image to the data center model 608. Data center operator 600 may also edit an existing image 610, delete an existing image 612, or replicate an existing image 614.

In summary, the present invention provides a mechanism for classifying and modeling operating system images for data center management. With the software model and classification provided by the present invention, different image types, including golden master, scripted OS, and snapshot, may be installed while some of the images, including golden master and snapshot images, may be captured. In addition, images under the management of a boot server may be discovered. Furthermore, images in the data center may be replicated, deleted, or edited by the user.

It is important to note that while the present invention has been described in the context of a fully functioning data processing system, those of ordinary skill in the art will appreciate that the processes of the present invention are capable of being distributed in the form of a computer usable medium of instructions and a variety of forms and that the present invention applies equally regardless of the particular type of signal-bearing media actually used to carry out the distribution. Examples of computer usable media include recordable-type media such as a floppy disc, a hard disk drive, a RAM, and CD-ROMs and transmission-type media such as digital and analog communications links.

The description of the present invention has been presented for purposes of illustration and description, but is not intended to be exhaustive or limited to embodiments of the invention in the form disclosed. Many modifications and variations will be apparent to those of ordinary skill in the art. The embodiment was chosen and described in order to best explain the principles of embodiments of the invention, the practical application, and to enable others of ordinary skill in the art to understand the invention for various embodiments with various modifications as are suited to the particular use contemplated.

What is claimed is:

1. A method in a data processing system for classifying and modeling operating system images for data center management, the method comprising:

classifying an operating system image as one of a golden master image, a scripted operating system image, and a snapshot image, wherein the golden master image comprises a depersonalized boot device image used for deployment on multiple systems, wherein the scripted operating system image comprises operating system installation files along with answer and configuration files that install an operating system on a target system using a boot server technology, and wherein the snapshot image comprises a volume image used only for restoring a same system and identical systems; and providing a software model for abstracting operating system and platform details and for managing the operating system image, wherein the software model comprises at least one software installable, wherein the at least one software installable is an image that resides in one of a file repository, a boot server, and an internal database of the boot server, wherein the image is defined using a software definition, wherein the software definition is one of a software stack and a software module, wherein the software stack comprises at least one software module, wherein a first software module of the software stack is an operating system module, wherein the at least one software module includes zero or more software module requirements, wherein the software module requirements specify functional requirements of a software module, and wherein the at least one software module is installed by an installation mechanism based on a priority that specifies an order in which images are installed.

2. A data processing system comprising:

a bus;

a memory connected to the bus, wherein a set of instructions are located in the memory; and a processing unit connected to the bus, wherein the processing unit executes the set of instructions to classify an operating system image as one of a golden master image, a scripted operating system image, and a snapshot image, wherein the golden master image comprises a depersonalized boot device image used for deployment on multiple systems, wherein the scripted operating system image comprises operating system installation files along with answer and configuration files that install an operating system on a target system using a boot server technology, and wherein the snapshot image comprises a volume image used only for restoring a same system and identical systems; and provide a software model for abstracting operating system and platform details and for managing the operating system image, wherein the software model comprises at least one software installable, wherein the at least one software installable is an image that resides in one of a file repository, a boot server, and an internal database of the boot server, wherein the image is defined using a software definition, wherein the software definition is one of a software stack and a software module, wherein the software stack comprises at least one software module, wherein a first software module of the software stack is an operating system module, wherein the at least one software module includes zero or more software module requirements, wherein the software module requirements specify functional requirements of a software module, and wherein the at least one software module is installed by an installation mechanism based on a priority that specifies an order in which images are installed.

3. A computer program product in a tangible computer usable storage medium for classifying and modeling operating system images for data center management, the computer program product comprising:

first instructions for classifying an operating system image as one of a golden master image, a scripted operating system image, and a snapshot image, wherein the golden master image comprises a depersonalized boot device image used for deployment on multiple systems, wherein the scripted operating system image comprises operating system installation files along with answer and configuration files that install an operating system on a target system using a boot server technology, and wherein the snapshot image comprises a volume image used only for restoring a same system and identical systems; and second instructions for providing a software model for abstracting operating system and platform details and for managing the operating system image, wherein the software model comprises at least one software installable, wherein the at least one software installable is an image that resides in one of a file repository, a boot server, and an internal database of the boot server, wherein the image is defined using a software definition, wherein the software definition is one of a software stack and a software module, wherein the software stack comprises at least one software module, wherein a first software module of the software stack is an operating system module, wherein the at least one software module includes zero or more software module requirements, wherein the software module requirements specify functional requirements of a software module, and wherein the at least one software module is installed by an installation mechanism based on a priority that specifies an order in which images are installed.

* * * * *

UNITED STATES PATENT AND TRADEMARK OFFICE
CERTIFICATE OF CORRECTION

PATENT NO. : 7,653,894 B2
APPLICATION NO. : 11/121596
DATED : January 26, 2010
INVENTOR(S) : Iszlai et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1302 days.

Signed and Sealed this

Twenty-third Day of November, 2010

David J. Kappos
*Director of the United States Patent and Trademark Office*